United States Patent [19]

Österberg et al.

[11] Patent Number: 5,561,839
[45] Date of Patent: Oct. 1, 1996

[54] METHOD AND ARRANGEMENT IN MOBILE TELECOMMUNICATIONS NETWORKS TO PROVIDE FOR IMPROVED CELL PLANNING

[75] Inventors: Anette Österberg, Stockholm; Henrik Rosenlund, Farsta; Fredrik Arinell, Stockholm, all of Sweden

[73] Assignee: Telia AB, Farsta, Sweden

[21] Appl. No.: 157,108

[22] PCT Filed: Jun. 24, 1993

[86] PCT No.: PCT/SE93/00577

§ 371 Date: Aug. 22, 1994

§ 102(e) Date: Aug. 22, 1994

[87] PCT Pub. No.: WO94/06222

PCT Pub. Date: Mar. 17, 1994

[30] Foreign Application Priority Data

Aug. 28, 1992 [SE] Sweden ................... 9202466

[51] Int. Cl.$^6$ ............................................. H04Q 7/36
[52] U.S. Cl. ..................... 455/33.1; 455/56.1; 455/63; 379/59
[58] Field of Search ........................... 435/33.1, 54.1, 435/56.1, 62, 63; 379/59, 60

[56] References Cited

U.S. PATENT DOCUMENTS

| | | | |
|---|---|---|---|
| 5,241,686 | 8/1993 | Charbonnier | 455/54.1 |
| 5,265,150 | 11/1993 | Helmkamp et al. | 455/56.1 |
| 5,293,640 | 3/1994 | Gunmar et al. | 455/33.1 |
| 5,307,510 | 4/1994 | Gunmar et al. | 453/33.1 |

FOREIGN PATENT DOCUMENTS

| | | |
|---|---|---|
| 468921 | 4/1993 | Sweden. |
| WO92/07429 | 4/1992 | WIPO. |
| WO93/15591 | 8/1993 | WIPO. |

*Primary Examiner*—Edward F. Urban
*Attorney, Agent, or Firm*—Oblon, Spivak, McClelland, Maier & Neustadt, P.C.

[57] ABSTRACT

The invention relates to a method and an arrangement in mobile telecommunications systems comprising, on the one hand, one or more cells operating with channels/frequencies, which cells belong to one or more base stations, and, on the other, one or more first and second mobile units, for producing one or more first representations of traffic intensity within one or more geographic areas. One or more second mobile units are provided with elements for measuring and evaluating signal strength. The measurements are carried out at a number of geographic positions on transmission from one or more first mobile units to a base station. In those cases where the signal strength exceeds a predetermined value, this value is stored, together with information on frequencies and geographic positions. One or more second representations of the traffic intensity in a respective geographic position are established in dependence on the number of stored values which have been obtained when measuring at the geographic positions. The first representation of the traffic intensity within a respective geographic area is produced in dependence on the second representations compiled in the measuring and storing elements, whereby the first representation provides for improved cell planning by forming a better basis for cell planning.

3 Claims, 2 Drawing Sheets

METHOD AND ARRANGEMENT IN MOBILE TELECOMMUNICATIONS NETWORKS TO PROVIDE FOR IMPROVED CELL PLANNING

FIELD OF THE INVENTION

The present invention relates to a method and an arrangement in mobile telecommunications systems which operate with channels/frequencies. These mobile telecommunications systems usually comprise, on the one hand, a number of base stations operating with channels/frequencies, which stations are connected to one or more mobile telephone exchanges, constituting a network system, and, on the other, of a number of mobile units. The mobile telecommunications system operates with a large number of channels/frequencies. As an example, the NMT system can be mentioned in which several hundred channels/frequencies are used. In areas with high traffic, however, this number of channels/frequencies is not sufficient. These areas are therefore provided with so-called microcell technology. Microcell technology involves a reduction in the size of the cells. That is to say, the output power is reduced, which leads to it being possible to reduce the distance to base stations with the same channel/frequency. The result is that the channels can be utilised in a more efficient way. The number of channels/frequencies which are allocated to an affected base station is related to the degree of utilisation of the base station. In addition, the method and arrangement are of the type which utilises elements for measuring and evaluating the signal strength which is transmitted from one or more mobile units.

PRIOR ART

It has already been known to carry out measurements of the traffic loading within the coverage area of a base station, here called a cell. The measurement values which have been obtained in association with these measurements provide a conception of a total traffic loading within the cell of the affected base station. The measurement values have not provided any conception of how the traffic is then distributed within the cell of the affected base station.

It is characteristic of these measurements that they have been carried out at an affected base station from the mobile telephone exchange side to the mobile unit side. These measurements have not provided a satisfactory basis for cell planning in mobile telecommunications systems.

SUMMARY OF THE INVENTION

Today's mobile telecommunications systems presuppose accurate cell planning in association with setting up new base stations or in association with changes in the traffic pattern. The nature of the basis for the cell planning is therefore of significant importance. It is desirable for the basis of the cell planning to provide a representation of traffic intensity linked to strategic geographic positions. The resolution of this representation must be considerably better than the size of the cells.

The invention relates to being able to solve this problem, among others.

In an embodiment of the invention, the signal strength is detected at one or more time points from one or more geographic positions, for which it is to be possible to produce a mean value and it is to be possible to establish a first representation in such a manner that the mean value of the traffic intensity is linked geographically within a variable time interval. The invention is also intended to solve this problem.

In an embodiment of the subject of the invention, a threshold function arranged in the measuring and evaluating elements is used in which it is to be possible to vary an adjustable threshold value in such a manner that the size of the threshold value determines the resolution in the part-representations. The invention is also intended to solve this problem.

In an embodiment of the subject of the invention, an antenna element is utilised by means of which it is to be possible to receive measurement values of the signal strength. This antenna element is to be located in a favorable manner from the point of view of measuring. The invention is also intended to solve this problem.

When new base stations are established or new systems are established within mobile communication, there is a great need for mapping geographically the traffic loading/intensity within the affected area. This mapped loading/intensity should be compiled to form only one geographic representation of preferably the coverage area of one base station, a cell. In addition, this representation should have a high resolution. The representation should form the basis for the cell planning.

It is the object of the present invention to solve the above-mentioned problems and that which can, in this context, be considered as characterising the novel method is that one or more mobile units make use of the elements for measuring and evaluating signal strength, which elements were mentioned in the introduction and are incorporated in one or more second mobile units. The measuring and evaluating element incorporated in the second mobile unit is activated and detects the signal strength. This signal strength is detected at all the frequencies allocated to the base stations. The measurements take place on transmission from a first mobile unit to the base station. If the signal strength at the time of detection exceeds a predetermined value, the value is measured and stored in the element. The measured value is stored together with information on the frequency and the geographic position at the measurement occasion. The measurement values thus stored are compiled and evaluated with the aid of the measuring and storing elements, whereby one or more second representations of the traffic intensity in the respective geographic part-area/position are established. These second representations are produced in dependence on the number of stored measurement values which have been obtained in the respective part-area/position. A first representation of the traffic intensity within the respective geographic part-area/position is produced in dependence on the second representations compiled in the measuring and storing elements. This first representation provides for improved cell planning by constituting a better basis for cell planning.

In an embodiment of the concept of the invention, the measuring and evaluating element is provided with a threshold function. In those cases where the detected signal strength exceeds a predetermined or variable threshold value, information on frequency and geographic position is stored. This threshold value is inversely related to the size of the part-area. The resolution of the first representation is consequently related to the set threshold values of the measuring and evaluating element.

In a further embodiment of the concept of the invention, the number of calls taking place in all the affected part-areas is directly related to the number of stored measurement values. The said second representation is established by calculating the number of calls taking place, connections from first mobile units to the base station, in the part-area.

The invention also comprises an arrangement for carrying out the above method and that which can in this context be considered to be characterising of the novel arrangement is that one or more second mobile units are provided with measuring and evaluating elements. The measuring and evaluating elements are arranged to detect signal strength from first mobile units in the affected area within which the second mobile unit is located. The measuring and evaluating elements detect the signal strength on all the channels/frequencies which are used by the said first mobile units. The detections are carried out from one or more geographic positions and relate to transmission from a first mobile unit to the base station. The measuring and evaluating elements are arranged so that in those cases where the signal strength exceeds a predetermined value, this value is measured and stored. The value is stored in the measuring and storing elements together with information on frequencies and geographic positions. The measuring and evaluating elements are arranged to compile and evaluate the stored measurement values and to establish one or more second representations of traffic loading/intensity for a respective geographic part-area/position. These second representations reflect the number of stored values which have been obtained in a respective geographic part-area. The measuring and evaluating elements are arranged to compile the second representations in order to produce a first representation of the traffic intensity within a respective geographic area. This first representation can be read out from the measuring and storing element, in turn providing a better basis for improved cell planning.

BRIEF DESCRIPTION OF THE DRAWINGS

In the text which follows, a presently prescribed embodiment of the method and arrangement according to the invention will be described while at the same time referring to the attached drawings, in which.

DETAILED DESCRIPTION OF A PREFERRED EMBODIMENT

Figure 1:
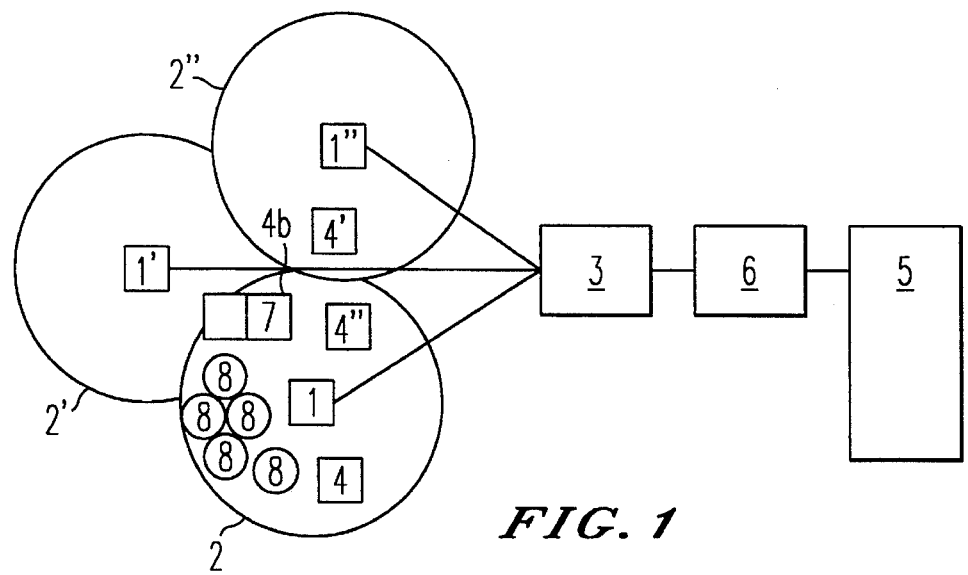
FIG. 1 shows in block diagram form a preferred embodiment of the invention.

In FIG. 1, a preferred embodiment of the invention is shown. The arrangement is used in a mobile telecommunications system, for example an NMT system, which operates with coverage areas, cells 2, 2', 2", linked to the base stations 1, 1', 1". The system comprises, on the one hand, one or more base stations 1, 1', 1", operating with coverage areas, cells, 2,2", 2", which stations are connected by means of a mobile telephone exchange 3 to a network system, a so-called cellular system, and, on the other, a number of first mobile units 4,4', 4". The mobile telephone exchange 3 constitutes the interface to the normal fixed telephone network 5 and is connected to a switching station 6. The fixed telephone network 5 then constitutes a link between one or more mobile telephone exchanges 3. A channel frequency which is used by coverage area 2 linked to a base station 1 cannot normally make use of a channel/frequency which is used by any of the coverage areas, neighbouring cells 2', 2", adjacent to the coverage area 2. If a larger area is to be covered, this can either be done using several of the coverage areas 2, 2', 2" of the base stations, or by means of a larger coverage area. While the latter certainly provides a lower traffic capacity within the affected area, this is usually not a major problem in sparsely populated areas. With high traffic capacity there is a requirement for many coverage areas 2,2', 2" and for the channels which do exist to be repeated. The dependence of the capacity on the size of the coverage area 2,2', 2" can be utilised by creating smaller coverage areas, so-called microcells, in areas with heavy traffic loading/intensity. These areas with intensive traffic loading can be very widely spread geographically within a relatively large coverage area. To provide as efficient a utilisation of the mobile system as possible in association with the establishment of new base stations 1,1', 1" or new systems, one or more second mobile units 4b are provided with measuring and evaluating elements 7. These measuring and evaluating elements 7 detect the signal strength from the first mobile units 4,4', 4". This signal strength is detected for all the frequencies allocated to the base stations 1,1', 1". For each of the detected channels/frequencies for which the signal strength exceeds a predetermined value, this value is stored in the measuring and evaluating element 7. These values are saved together with information on the geographic position 8 within the coverage area 1,1', 1" to which the affected mobile unit 4,4', 4" belongs, and the affected channel frequency on which the measurement was carried out. These measurements are carried out at a number of different geographic positions 8 within the coverage area 2,2', 2". The measurement values thus stored in the measuring and evaluating elements 7 are then locally compiled in the elements 7. The compiled measurement values are then evaluated in the measuring and evaluating elements 7 which establish a second representation. This second representation represents the traffic loading/intensity for the geographic positions, part-areas 8, where the signal strength exceeded the predetermined threshold value and is established in dependence on the number of stored values which were obtained in respect of these geographic positions, part-areas 8. These second representations, in turn, can be compiled in the measuring and evaluating elements 7 to form a first representation. This first representation is produced in dependence on the second representations compiled in the measuring and evaluating elements 7. The first representation thus constitutes a better basis for cell planning, which provides for improved cell planning.

Figure 2:
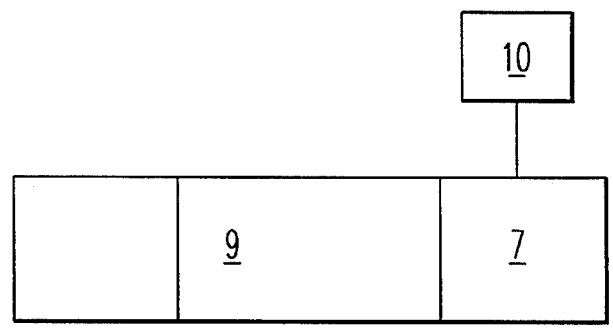
FIG. 2 shows in block diagram form a mobile unit belonging to a mobile telecommunications system which operates in coverage areas, cells, linked to the base stations.

In FIG. 2, a second mobile unit 4b belonging to a mobile telecommunications system is shown, which operates with coverage areas, cells, linked to the base stations. The second mobile unit 4b is provided with a measurement receiving and evaluating element 7. The measurement receiving and evaluating element 7 is coupled to a separate antenna unit 9. This antenna unit 9 is placed at a low height, preferably on the roof of the car. The measurement receiving and evaluating elements 7 are arranged to detect the signal strength from one or more first mobile units linked to a base station. The measurement receiving and evaluating elements 7 detect the signal strength if it exceeds a predetermined value, a threshold level. This threshold level can be varied. The measurement receiving and evaluating elements 7 sweep through all frequencies/channels in the frequency band used by the first mobile units.

The second mobile unit 4b moves between a number of geographic positions. At each geographic point, the measurement receiving and evaluating elements 7 perform a detection of the signal strength. By varying the threshold level on these detection occasions, the size of the part-area which is linked to the geographic point at which the detection is carried out is changed. In general, it holds true that the signal strength from a transmitter at a distance D from a receiver in clear view can be written P=K-N*10 log D, where K is a reference level one meter from the transmitter antenna and N is a wave propagation factor dependant on the environment. By using the above formula (knowledge of the output power used), a relationship between threshold value and maximum distance to the measured first mobile units can thereby be obtained, which has the consequence that, the higher the threshold value, the more well defined the part-area around the geographic positions becomes. The value which is detected in these detections is stored in the measurement receiving evaluating element 7 together with information on the geographic position and channel/frequency on the occasion of the measurement. The measurement values thus stored in the measurement receiving and evaluating elements 7 are then compiled locally in the elements 7. The compiled measurement values are then evaluated in the measuring and evaluating elements 7 which establish a second representation. This second representation represents the traffic loading/intensity for the geographic positions, part-areas, where the signal strength has exceeded the predetermined threshold value and is established in dependence on the number of stored values which have been obtained in respect of these geographic positions, part-areas. The resolution in these presentations is related to the value of the threshold level. These second representations, in turn, can be compiled in the measuring and evaluating elements 7 to form a first representation. This first representation is produced in dependence on the second representations compiled in the measuring and evaluating elements 7. The first representation thus constitutes a better basis for cell planning, which provides for improved cell planning.

Figure 3:
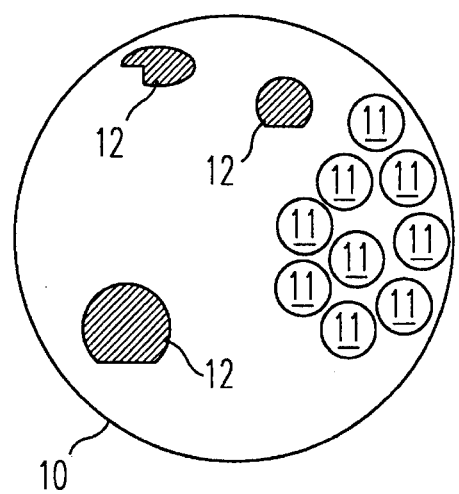
FIG. 3 shows a representation of a geographically linked traffic loading/intensity in a cellular system.

In FIG. 3, a first representation 10 is shown of geographically linked traffic loading/intensity in a cellular system. This type of system also has a space dimension, apart from the normal dimensions of frequency and time. The number of coverage areas, cells, in this system is related to the traffic loading/intensity in the affected area. If there is a relatively large number of coverage areas (but a lower output power), a more frequent pattern of repetition of channels and frequencies in the space can also be provided, which means that the distance to base stations having the same channel frequency is shorter. The channels/frequencies are utilised in a more effective way, that is to say the capacity in the area increases when more and smaller coverage areas, cells, are introduced. In association with the introduction of new base stations into the system, a basis for cell planning is used in the form of a representation 10 of the traffic loading/intensity within a coverage area, a cell. This first representation 10 is composed of a number of second representations, part-representations 11. These second representations 11 are established, by the above-mentioned measuring and evaluating elements, by means of the above-mentioned compiled measurement values where the number of stored values which have been obtained in these respective geographic positions, part-areas, is represented. These measurement values are measured and stored for each of the detected channels/frequencies where the signal strength exceeds a predetermined value. These values are saved together with information on the geographic position within the coverage area to which the affected mobile unit belongs, and the affected channel frequency at which the measurement is carried out. These measurements are carried out at a number of different geographic positions within the coverage area. The number of geographic positions/second representations is a factor which determines the resolution of the first representation 10. This first representation 10 provides a visual image of how the traffic is distributed within the coverage area, the cell, and contains geographically attributable markings 12 over traffic intensive part-areas within the affected coverage area, cell. The first representation 10 thereby constitutes a better basis for cell planning, which provides for improved cell planning.

Figure 4:
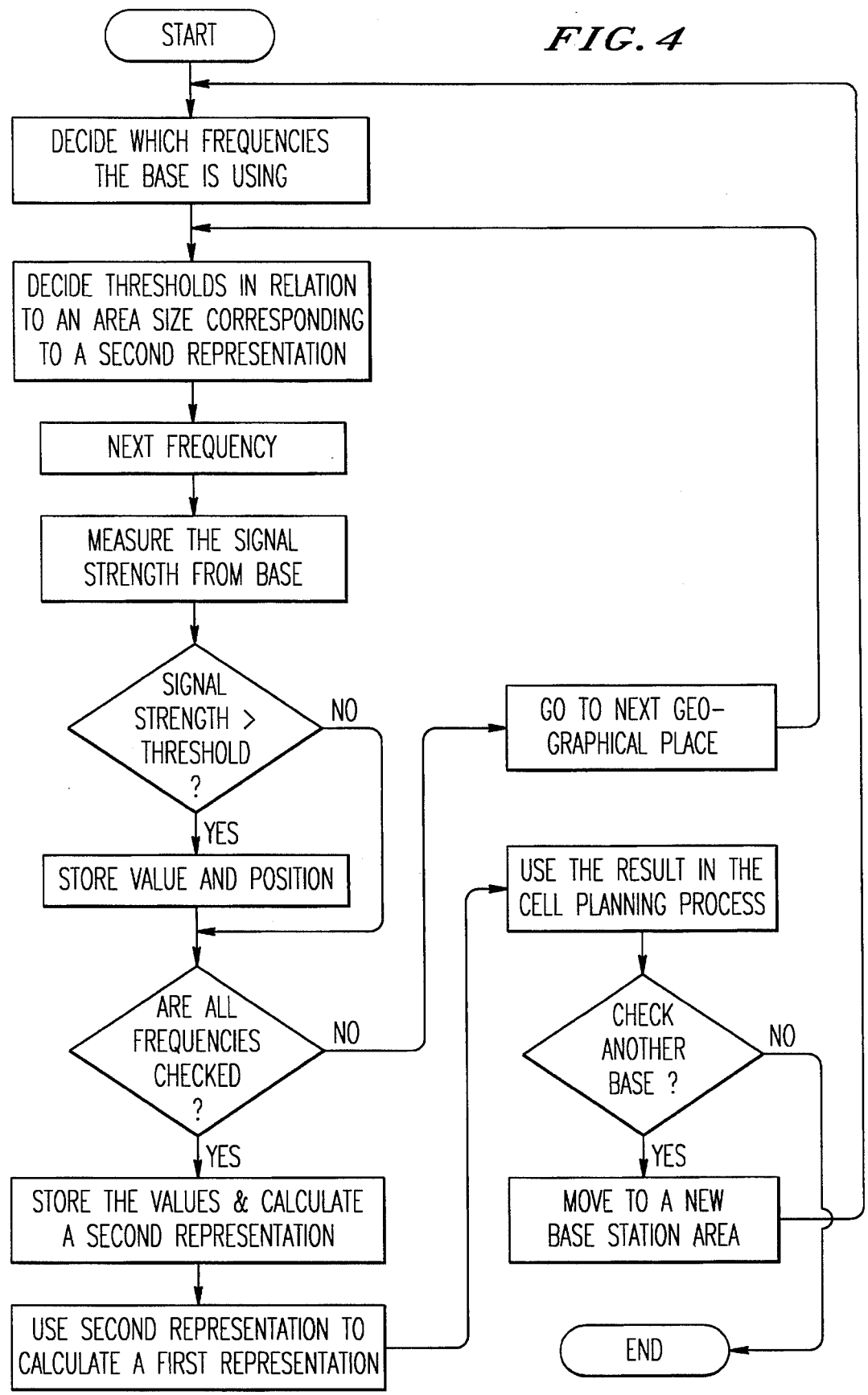
FIG. 4 is a flow chart according to this invention.

FIG. 4 is a simplified flow chart showing the above procedure.

The invention is only delimited by the patent claims specified below.

We claim:

1. A method of producing a systemwide representation of channel utilization in a mobile cellular system, comprising the steps of:

determining a threshold value for signal strength measurements in relation to an area size corresponding to a second representation;

transmitting from plural mobile units on respective plural channels;

measuring in a measuring and evaluating element a signal strength for each of the plural channels from plural geographic positions;

storing, to be used in generating second representations, for each of the plural frequencies where the signal strength exceeds the threshold value, a time of measurement, the frequency exceeding the threshold value and the geographic position where the measurement was obtained; and generating a first representation for a given geographic area using the area size of the second representations to represent the channel utilization at specific regions in the geographic area.

2. A method of producing a system wide representation of channel utilization in a mobile cellular system, comprising the steps of:

varying a threshold value for signal strength measurements in relation to a varying size of an area corresponding to a second representation;

transmitting from plural mobile units on respective plural channels;

measuring in a measuring and evaluating element a signal strength for each of the plural channels from plural geographic positions;

storing, to be used in generating second representations, for each of the plural frequencies where the signal strength exceeds the varying threshold value, a time of measurement, the frequency exceeding the varying threshold value, the varying threshold and the geographic position where the measurement was obtained; and generating plural first representations for a given geographic area based on the varying threshold values and using the respective varying area sizes of the second representations to represent the channel utilization at specific regions in the geographic area.

3. A method of producing a systemwide representation of channel utilization in a mobile cellular system, comprising the steps of:

determining a threshold value for signal strength measurements in inverse relation to an area size corresponding to a second representation;

transmitting from plural mobile units on respective plural channels;

measuring in a measuring and evaluating element a signal strength for each of the plural channels from plural geographic positions;

storing, to be used in generating second representations, for each of the plural frequencies where the signal strength exceeds the threshold value, a time of measurement, the frequency exceeding the threshold value and the geographic position where the measurement was obtained; and generating a first representation for a given geographic area using the area size of the second representations to represent the channel utilization at specific regions in the geographic area.

* * * * *